(12) United States Patent
White

(10) Patent No.: US 10,479,149 B2
(45) Date of Patent: Nov. 19, 2019

(54) TIRE CHAIN INSTALLATION TOOL

(71) Applicant: Ronald J. White, Redding, CA (US)

(72) Inventor: Ronald J. White, Redding, CA (US)

( * ) Notice: Subject to any disclaimer, the term of this patent is extended or adjusted under 35 U.S.C. 154(b) by 302 days.

(21) Appl. No.: 15/418,296

(22) Filed: Jan. 27, 2017

(65) Prior Publication Data
US 2017/0217264 A1 Aug. 3, 2017

Related U.S. Application Data

(60) Provisional application No. 62/290,109, filed on Feb. 2, 2016.

(51) Int. Cl.
*B60C 27/00* (2006.01)
*B60C 27/22* (2006.01)
*B60C 27/06* (2006.01)

(52) U.S. Cl.
CPC .......... *B60C 27/003* (2013.01); *B60C 27/063* (2013.01); *B60C 27/22* (2013.01); *Y10T 29/53961* (2015.01); *Y10T 29/53978* (2015.01)

(58) Field of Classification Search
CPC ..... B60C 27/003; B60C 27/14; B60C 27/063; B60C 27/22; B60C 27/06; B60C 27/064; Y10T 29/49947; Y10T 29/53961; Y10T 29/53978
See application file for complete search history.

(56) References Cited

U.S. PATENT DOCUMENTS

| | | | | |
|---|---|---|---|---|
| 3,585,883 A * | 6/1971 | Insam | ...................... | B60C 27/14 81/15.8 |
| 4,031,939 A * | 6/1977 | De Martini | ............. | B25B 27/22 152/213 R |
| 5,020,396 A * | 6/1991 | Dunn | ...................... | B60C 27/06 81/15.8 |
| 5,079,976 A * | 1/1992 | Priest | .................... | B60C 27/003 81/15.8 |
| 5,255,577 A * | 10/1993 | Keefauver | .............. | B25B 25/00 152/213 R |
| 6,598,635 B2 * | 7/2003 | Amyotte | ............... | B60C 27/145 152/214 |
| 8,714,054 B1 * | 5/2014 | Hiles | ..................... | B60C 27/003 152/220 |
| 8,919,400 B2 * | 12/2014 | Stewart | ................... | B60C 27/06 152/213 R |

FOREIGN PATENT DOCUMENTS

JP 10146774 A * 6/1998

* cited by examiner

*Primary Examiner* — Sarang Afzali
(74) *Attorney, Agent, or Firm* — Heisler & Associates

(57) ABSTRACT

The tool includes an elongate rigid bar with fixed chain leaders extending from the bar near ends of the bar. A removable chain leader is provided between these two fixed chain leaders. In one form of the invention, the bar is hollow and a pin translates within this hollow core. A slot in the bar allows a proximal link of the removable chain leader to pass into the hollow core of the bar where the pin can removably capture this proximal link. Because the removable chain leader is provided on the bar, it can initially be captured to the bar for use along with the fixed chain leaders to position a tire chain onto a dual wheel pair. Then, the removable leader can be removed from the bar and act as a handle on a middle elongate section of the tire chain to assist in connection thereof.

8 Claims, 3 Drawing Sheets

TIRE CHAIN INSTALLATION TOOL

CROSS-REFERENCE TO RELATED APPLICATIONS

This application claims benefit under Title 35, United States Code § 119(e) of U.S. Provisional Application No. 62/290,109 filed on Feb. 2, 2016.

FIELD OF THE INVENTION

The following invention relates to tools for assisting in the installation of tire chains along with a method for use of such tools. More particularly, this invention relates to tools which hold one end of a tire chain and allow for it to be held to a dual wheel pair, so that the dual wheel pair can be rotated until an opposite end of the tire chain has been positioned for attachment to a first end of the tire chain to complete the tire chain installation process. More particularly, this invention relates to methods and apparatuses for tire chain installation which are particularly configured for dual wheel pairs and which include an elongate rigid bar with leaders extending therefrom including a middle leader removably attachable to the bar so that it can most conveniently assist in coupling a center longitudinal tire chain section back to itself during installation onto a dual wheel pair.

BACKGROUND OF THE INVENTION

Tire chains are provided to enhance traction for tires, such as in snowy and frozen conditions. Tire chains come in a variety of different configurations. Most typically tire chains include two longitudinal left and right sections of chain which are configured to have ends thereof attachable to each other and with transverse sections of chain extending therebetween. The tire chains are wrapped around a tire so that the transverse sections run perpendicular to a direction of vehicle motion and the longitudinal sections run parallel to the direction of vehicle motion.

Related traction enhancement devices are often generally referred to within the general category of "tire chains" but are more accurately described as using cables or other materials for the longitudinal sections and/or for the transverse sections. The term "tire chains" is broadly used herein to refer to all such devices. With tire chains of all varieties, it is desirable to make the tire chain installation and removal process as simple as possible. Typically tire chains are installed during inclement weather along an edge of a road, and often in poor visibility. Thus, both comfort and safety strongly benefit from tire chains which can be quickly and easily installed in a secure fashion.

Many trucks have wheels and tires provided in dual wheel pairs, especially on drive wheels thereof. As tire chains are typically placed on the drive wheels, some tire chains have been configured particularly to accommodate attachment to dual wheel pairs. In particular, they include three longitudinal sections of chain or other material (left, right and central) and transverse sections of chain or other material between the central section and the left and right sections. In other instances, when separate tire chains are placed on a left and a right wheel of a dual wheel pair, it is desirable to install the two chains simultaneously to simplify the chain installation process. Whether a single dual wheel tire chain is utilized or a pair of tire chains are utilized, a need exists for simpler and quicker ways to securely attach tire chains to dual wheel pairs of a vehicle.

A typical method of tire chain installation involves laying out the tire chains on the ground in front of or behind the tire. Such a step is also utilized when placing tire chains on dual wheel pairs. The vehicle is then driven over at least a portion of the tire chains. Finally, portions of the tire chains in front of and behind the wheel (or wheels) are wrapped over the tire (or tires) and attached back to each other to gird the tire. Finally, typically a tightening procedure is utilized, and in many instances some form of tensioner used, to keep the tire chains tightly upon the tires.

Often a most difficult portion of this tire chain installation process involves hooking the tire chains back to themselves to complete the tire girding procedure. While the longitudinal sections of chain or other material on the left and right sides of the dual wheel pair can be relatively easily attached, the center longitudinal section is not as easily attached. The central longitudinal section of chain or other material between the two tires can be especially difficult to reach, grasp and connect, as the space between the tires is tight. Thus, significant difficulty can be encountered and greater amounts of time and energy are required to be spent in inclement weather and in a hazardous roadside environment.

SUMMARY OF THE INVENTION

With this invention, a tire chain installation tool is provided especially for placing tire chains onto dual wheel pairs, such as those often on a truck or bus. The tool includes an elongate rigid bar with three leaders attached thereto. Two of the leaders are attached near left and right ends of the bar. A middle leader is provided attaching to a midpoint on the bar. While chain is shown in an exemplary embodiment, cables or other elongate materials could alternatively be used for the leaders. These leaders have a coupler, such as a hook of some type at distal ends thereof most distant from the bar.

Importantly, the middle leader is connected to the bar in a removable fashion. In one embodiment disclosed, a slot is provided in the hollow bar and a proximal link at an end of the middle leader opposite a coupler thereof slips into this slot. An elongate pin is located partially inside the hollow core of the bar and is movable within the hollow core of the bar to selectively engage the middle leader or release the middle leader when the proximal link is placed within the slot in the bar.

Initially, the middle leader is captured to the bar and the entire bar and two end leaders as well as the middle leader are all carried together as a unit. The bar is placed through holes in a pair of rims supporting the dual wheel pair. The bar is oriented perpendicular to a direction of vehicle travel and passing through each of the rims with edges adjacent to lateral sides of the two tires spaced from the gap between the tires. One of the end leaders most distant from the pin is also fed through these holes in the rim so that it is located all of the way through the dual wheel rims. The middle leader is fed through an outer rim of the pair of dual rims through the rim hole, so that the middle leader resides at a midpoint between the two tires after the bar has been placed through the holes in the dual rims.

Next, first ends of the three longitudinal sections of the tire chains are coupled to the tool of this invention by having the first ends coupled to the couplers on each of the leaders on the tool, including the left leader, middle leader and right leader. Once so hooked together, the dual wheel tire chains are connected to the installation tool and ready to be wrapped around the dual wheel pair. Next, the vehicle operator drives (typically forward) until the tire chains have wrapped around the tires on the dual wheel pair at least partially.

Finally, clips or other connectors at the second ends of each of the longitudinal segments of the tire chains are used to connect to the first ends of these longitudinal sections to complete the chain attachment process. The left end leader of the tool can be easily found and used to locate the first end of the corresponding longitudinal section for attachment to the connector at the second end. Similarly, the right end leader of the tool can be followed from the bar to find the first end of the corresponding longitudinal section for attachment to the corresponding connector at its second end.

Finally, the pin is extended partly out of the bar which allows the middle leader of the tool to be disconnected from the bar. The middle leader is thus now acting as an elongate leader dangling from the first end of the central longitudinal section of the tire chains. This additional length makes the first end of the central section more easily grasped and positioned where desired for connecting to the connector on the second end of the central section of the tire chains. The bar can then be removed from the holes in the wheel rims and the middle leader can be reattached to the bar by returning the pin back into the bar. Preferably a spring biases the pin in a capture position. The tool can then be reused, such as on a dual wheel pair on an opposite side of the vehicle. The tool can similarly be utilized on two separate pairs of tire chains simultaneously, by merely having the middle leader of the tool connected through its coupler to each of the longitudinal sections of tire chains located adjacent to the gap between the two tires.

The pin is preferably captured within the bar so that it cannot fall entirely out of the bar, but is allowed to slide within the bar to either engage the middle leader within the slot or release the middle leader within the slot. In one embodiment, a stop is provided on the pin which abuts against an end wall closing the hollow bar (except for a hole through which the pin passes), to keep the pin from falling entirely out of the bar. The bar preferably has a hollow core to allow the pin to easily move therein except for when the stop abuts the end wall or compresses a spring between the stop and the end wall. The bar can be formed as a hollow cylindrical structure which has end plates affixed thereto, such as by welding and with a hole for the pin to pass through the end wall, and with holes for the left leader and right leader to attach thereto.

OBJECTS OF THE INVENTION

Accordingly, a primary object of the present invention is to provide a tool for simplifying the installation of tire chains onto dual wheel pairs.

Another object of the present invention is to provide a method for installation of tire chains onto dual wheel pairs.

Another object of the present invention is to decrease an amount of time required to install tire chains onto the wheels of trucks with dual wheel pairs requiring chains thereon.

Another object of the present invention is to simplify the process of installation of tire chains onto dual wheel pairs.

Another object of the present invention is to provide a tire installation tool which is of simple reliable construction and is easily operated.

Another object of the present invention is to provide a tool and method which particularly assists in locating and handling a center longitudinal portion of tire chains configured for installation upon dual wheel pairs.

Other further objects of the present invention will become apparent from a careful reading of the included drawing figures, the claims and detailed description of the invention.

DESCRIPTION OF THE PREFERRED EMBODIMENT

Figure 1:
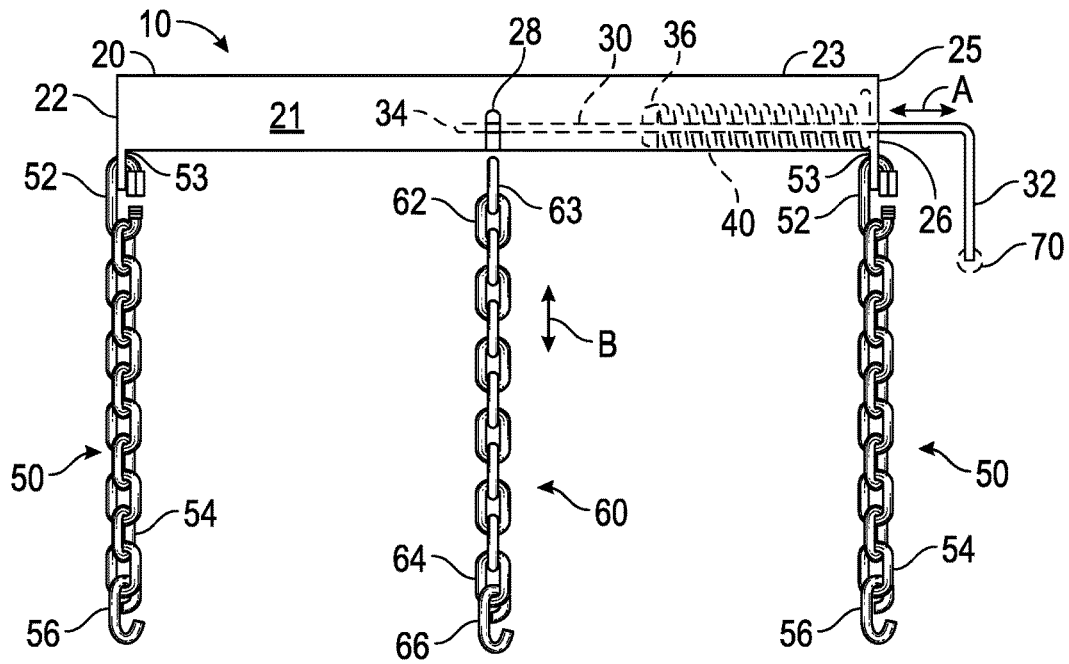
FIG. 1 is a top plan view of the tool of this invention with a removably attachable middle leader shown attached to the remainder of the tool.

Referring to the drawings, wherein like reference numerals represent like parts throughout the various drawing figures, reference numeral 10 is directed to a tool for installation of dual wheel tire chains D upon tires T mounted to rims R of a dual wheel pair W. The tool 10 is usable with dual tire chains D which could be in the form of lengths of chain or lengths of cable, straps or other lengths of different materials. Most typically the dual tire chains D have three longitudinal segments of chain or other material and multiple transverse sections of chain or other material. The three longitudinal sections of the dual tire chains D are spaced apart so that a middle section resides between the two wheels W of the dual wheel W pair and one of the longitudinal sections is adjacent to a left side of the dual wheel W pair and the other longitudinal section is located adjacent to a right side of the dual wheel W pair. With the tool 10 of this invention the dual tire chains D are more easily placed upon the tires T of the dual wheel W pair.

Figure 2:
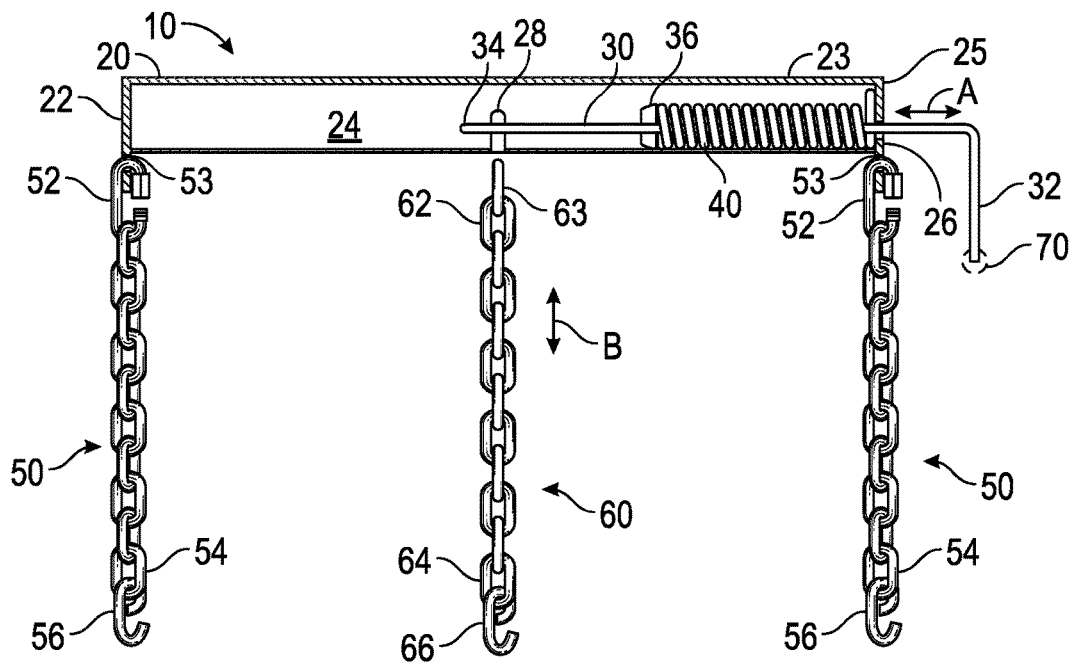
FIG. 2 is a top plan view similar to that which is shown in FIG. 1, but with a bar portion thereof shown in full section to reveal interior details of the tool.

In essence, and with particular reference to FIGS. 1 and 2, basic details of the tool 10 are described, according to the preferred embodiment. The tool 10 includes a rigid elongate bar 20. This bar 20 has a hollow core 24 with a sliding pin 30 residing therein. The pin 30 can translate longitudinally (along arrow A) within the bar 20. A spring 40 is optionally but preferably associated with the pin 30 to bias the pin 30 toward a capture position more fully located within the hollow interior of the bar 20, than a release position where the pin 30 extends partially out of a hollow interior of the bar 20. A pair of fixed leaders 50 extends from the bar 20, preferably at or near left and right ends of the bar 20. A removable leader 60 also attaches to the bar 20 in a removable fashion, through coupling to the pin 30. Each of the leaders 50, 60 includes a hook 56, 66 or other coupler at distal ends thereof opposite the bar 20. These couplers can attach to links near a first end of the dual tire chains D when the tool 10 is in use. After initial placement of the tool 10 transverse to the wheel W, and typically through a hole H in a rim R of the dual wheel W pair, and the wheel W has been rotated until the dual tire chains D have been wrapped around the wheel W, clips C or other couplers on a second end of the dual tire chains D are brought close to the links L at a first end of the dual tire chains D for coupling of the clips C to the links L. The tool 10 can then be removed and the chain D installation process has been completed.

More specifically, and with continuing reference to FIGS. 1 and 2, specific details of the bar 20 of the tool 10 are described, according to a preferred embodiment. The bar 20 is elongate in form in that it is longer than it is wide, with a length similar to a maximum width of a dual wheel W pair, and with a width of the rod sufficiently small to allow it to pass through holes H in rims R of the wheel W. In one embodiment, the bar 20 is approximately one inch in diameter with a circular cross-section.

The bar 20 is preferably linear between a left end 22 and a right end 23 defining opposite ends of the bar 20. A side wall 21 is preferably provided with a cylindrical form extending between the left end 22 and the right end 23. The bar 20 has a hollow core 24 surrounded by this side wall 21. Material forming the bar 20 is preferably a strong rigid metal material, with steel being most preferable.

One of the ends 22, 23 is fitted with an end wall 25 having a hole 26 passing therethrough. This hole 26 accommodates passage of the pin 30 therethrough, as described in detail below. The end 22 opposite the one closed by the end wall 25 could similarly be closed if desired, or could be left open. The bar 20 could alternatively be formed of other materials such as aluminum, fiberglass, plastic or other materials. A slot 28 passes through the side wall 21 of the bar 20 defining an opening into the hollow core 24 defining an interior of the bar 20. This slot 28 is sufficiently large to allow a proximal length 63 of the removable leader 60 to pass therethrough for removable capture by the pin 30 adjacent to a tip 34 thereof.

With continuing reference to FIGS. 1 and 2, details of the pin 30 are described, according to this preferred embodiment. The pin 30 is an elongate rigid structure sized sufficiently small to fit within the hollow core 24 of the bar 20 and to facilitate longitudinal translation of the pin 30 within the bar 20 (along arrow A of FIGS. 1 and 2). In one embodiment, this pin 30 is circular in cross-section with a diameter of one-quarter inch. The pin 30 passes through the hole 26 in the end wall 25 with a handle 32 on the pin 30 on an exterior side of the end wall 25. A knob 70 or other structure can be placed on the handle 32 which can be formed of reflective or other high visibility material so that when the vehicle is moved to put the dual tire chain around the tire T a driver can more easily see the knob 70 in the driver's mirrors and know when about one revolution of the wheels W has occurred. A tip 34 is provided opposite the handle 32 and generally resides near a center of the hollow core 24 of the bar 20. The pin 30 is sufficiently long that it extends slightly past the slot 28 at the center point of the hollow core 24 of the bar 20, when the pin 30 is inserted entirely into the hollow core 24 of the bar 20.

The handle 32 is sized so that it cannot pass through the hole 26 in the end wall 25. Thus, the handle 32 abuts the end wall 25 of the bar 20 before the pin 30 can travel any further into the hollow core 24 of the bar 20. A stop 36 is affixed to the pin 30 to keep the pin 30 from being pulled entirely out of the hollow core 24 of the bar 20. Rather, the stop 36 abuts against the end wall 25, so that the pin 30 cannot travel any further out of the hollow core 24 of the bar 20.

A spring 40 is preferably interposed between the stop 36 and the end wall 25, within the hollow core 24 of the bar 20. This spring 40 is most typically positioned surrounding the pin 30, with the spring 40 in the form of a helical compression spring. When the pin 30 is translated more out of the hollow core 24 of the bar 20, the spring 40 is compressed between the stop 36 and the end wall 25, producing a force which tends to return the pin 30 back into the hollow core 24 of the bar 20. In this way, the pin 30 is biased toward a capture position where it can capture a proximal link 63 of the removable leader 60.

When a user grasps the handle 32 or other portions of the pin 30 and translates the pin 30 out of the hollow core 24 of the bar 20 somewhat, the tip 34 of the pin 30 travels sufficiently far that it releases the proximal link 63 from the tip 34 of the pin 30 and the proximal link 63 can be removed from the bar 20, while the pin 30 is in this release position. If desired, the end wall 25 can be removably attachable (such as by threading) to the bar 20 to facilitate assembly of the tool 10 with the pin 30 residing within the bar 20. Alternatively, the end wall 25 can be permanently attached, such as by welding, after the pin 30 has been installed within the bar 20, along with the optional spring 40.

With continuing reference to FIGS. 1 and 2, details of the fixed leaders 50 and removable leader 60 are described, according to a preferred embodiment. Each of the leaders 50, 60 can be referred to as a "chain leader" because it acts as a leader to capture a longitudinal section of the dual tire chains D. These leaders 50, 60 are shown in this preferred embodiment as lengths of chain material. However, these leaders 50, 60 could be formed of cables, straps or other elongate flexible structures, with lengths of chain being merely one option.

The two fixed chain leaders 50 are spaced from each other with a left fixed chain leader 50 closer to a left end 22 of the bar 20 than to the right end 23 and with a right fixed chain leader 50 located closer to the right end 23 of the bar 20 than to the left end 22. In a preferred form of the invention, these fixed chain leaders 50 are directly adjacent to the left end 22 and right end 23. Tabs 53 are preferably provided extending slightly from the left end 22 and right end 23 of the bar 20. One of these tabs 53 can double as the end wall 25 of the bar 20. The tabs 53 include holes passing therethrough which can receive a fixed end 52 of each fixed chain leader 50 coupled thereto, most preferably through a quick link that can be opened and closed to facilitate attachment during manufacture and to allow more convenient use on a single wheel by removing one of the fixed chain leaders 50.

The fixed chain leaders 50 extend from the fixed end 52 to distal free ends 54 opposite the fixed ends 52. These fixed ends 52 are also referred to as proximal ends when generically referring to their position as being closer to the bar 20. Free ends 54 opposite the fixed ends 52 are also alternatively referred to as distal ends when referring to their positions more distant from the bar 20 than the fixed end 52. The free ends 54 support a coupler thereon which can couple to a first end of the dual tire chains D, typically by coupling to an end link L on the first end of the dual tire chains D. This coupler is most preferably in the form of a hook 56. In one embodiment this hook 56 is merely a chain link which has been opened so that it has a "C" shape. Preferably this hook is fixed to the fixed chain leaders 50 and is sufficiently open so that it can readily be coupled to and removed from an end link L at the first end of the chains D.

The dual tire chains D have three longitudinal sections which each have first ends with end links L thereon. These end links L can be coupled to the hooks 56 during use of the tool 10. Other forms of couplers could include carabiners or various different types of clasping devices.

Most preferably, the removable chain leader 60 is similar to the fixed chain leaders 50 in every respect except that the removable chain leader 60 is not permanently affixed to the bar 20, but rather removably attachable thereto. In alternative embodiments, the removable chain leader 60 could have other differences from the fixed chain leader 60. The removable chain leader 60 thus includes a proximal end 62 removably attachable to the bar 20 and a distal end 64 opposite the proximal end 62. A hook 66 is provided at the distal end 64. A proximal link 63 has a hole passing therethrough sized large enough to receive the tip 34 of the pin 30 passing therethrough.

The proximal link 63 is sufficiently small to fit into the slot 28 in the side wall 21 of the bar 20. Thus, the proximal link 63 of the removable chain leader 60 can be placed into the slot 28 and the pin 30 can be moved to its release position, until the proximal link 63 is sufficiently far into the hollow core 24 of the bar 20 that return of the pin 30 to its capture position causes the pin 30 to pass through the proximal link 63 and capture the proximal link 63, along with the entire movable chain leader 60 to the pin 30 and hence to the bar 20. Other forms of capture mechanisms could alternatively be provided. Insertion of the removable chain leader 60 proximal link 63 into the slot 28 of the bar 20 occurs along arrow B of FIGS. 1 and 2.

Figure 3:
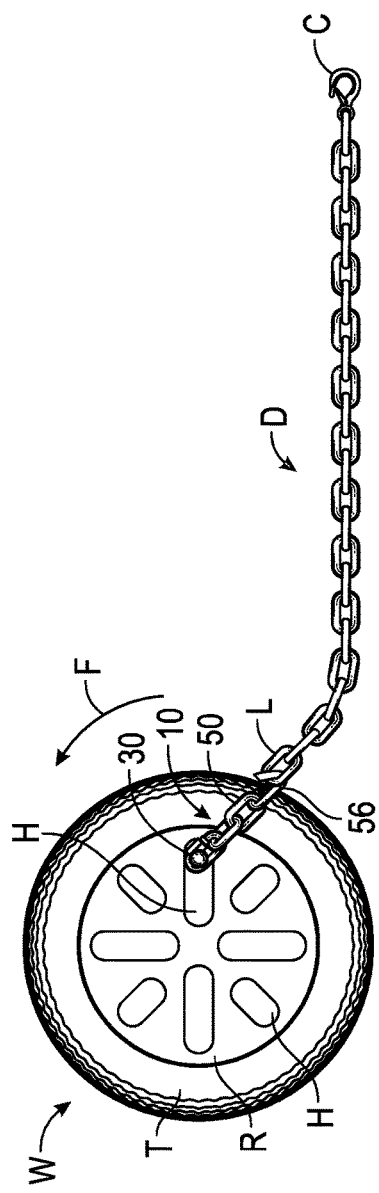
FIG. 3 is a side elevation view of the tool in use on a dual wheel pair and installing tire chains onto the dual wheel pair.
Figure 4:
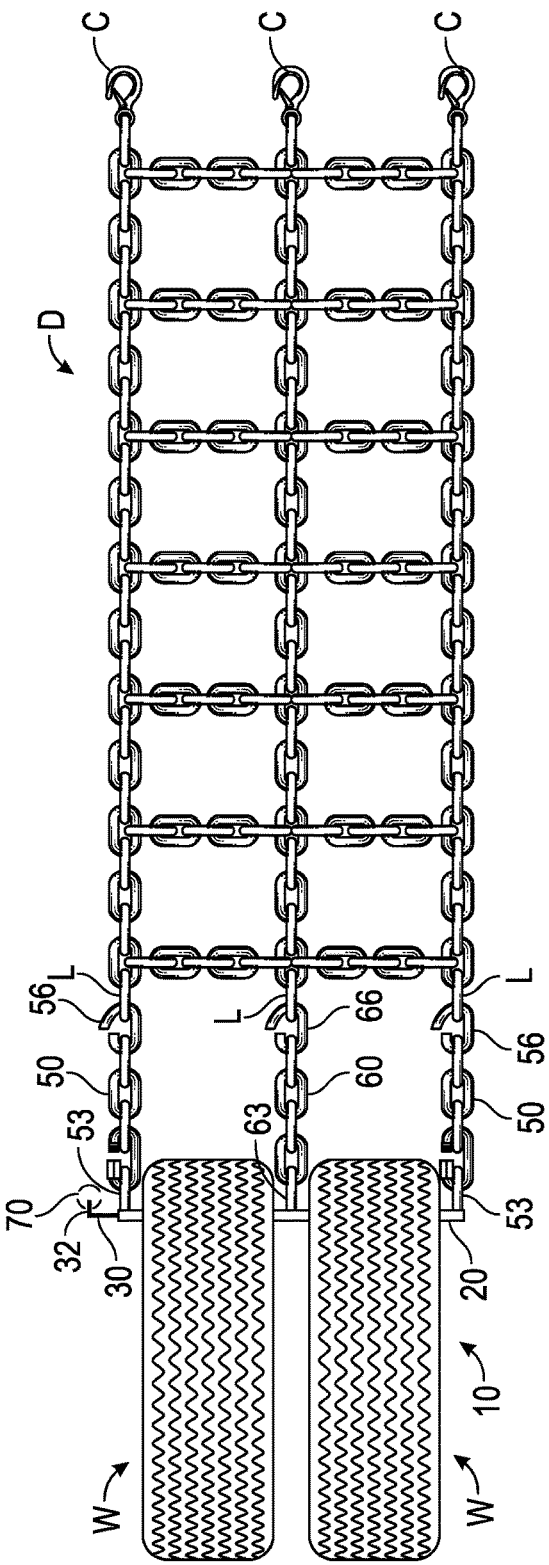
FIG. 4 is a top plan view of that which is shown in FIG. 3.
Figure 5:
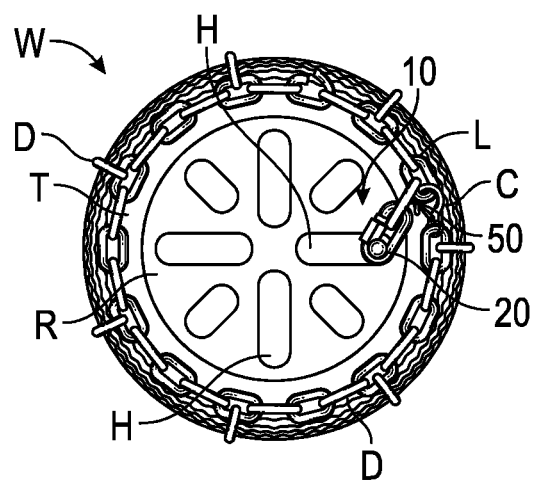
FIG. 5 is a side elevation view of a dual wheel pair, after the tire chains have been installed thereon utilizing the tool of this invention.
Figure 6:
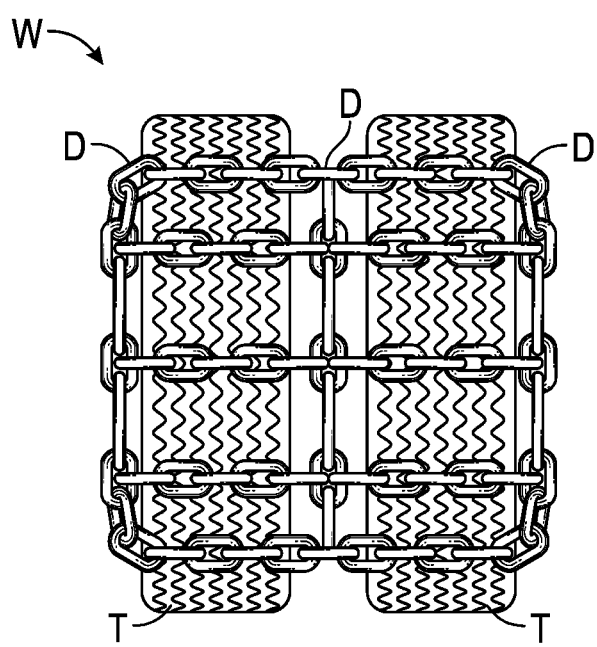
FIG. 6 is a front elevation view of that which is shown in FIG. 5 and showing the tire chains installed upon the dual wheel pair.

In use and operation, and with particular reference to FIGS. 3 and 4, details of the operation of the tool 10 of this invention to install dual tire chains D onto a dual wheel W pair, are described, according to a preferred embodiment. Initially, the tool 10 is configured with the removable chain leader 60 coupled thereto. The tool 10 is then positioned passing through holes H in the rims R of wheels W comprising the dual wheel pair upon which the tires T are mounted. When the tool 10 is passing through these holes H, the tool T is oriented generally perpendicular to a direction that the dual wheel W pair would roll upon an underlying surface. The tool 10 is inserted through this hole H until the left end 22 is exposed from a left side of the rim R and the right end 23 extends from the right side of the rim R. When in this position, a middle of the bar 20 is generally between the two wheels W mounted upon this rim (or rims) which form the dual wheel W pair. The leaders 50 will dangle downward from the bar 20 under forces of gravity at the left and right sides and middle space between the two tires T.

Next, the end links L on the longitudinal sections at the first end of the dual tire chains D are brought adjacent to the hooks 56, 66 or other couplers of the chain leaders 50 and these end links L are coupled to these hooks 56, 66. Preferably, the dual tire chains D are laid out flat trailing away from the dual wheel W pair, generally in the manner depicted in FIGS. 3 and 4. The vehicle upon which the wheels W are mounted is then moved to cause the wheels W to rotate a majority of one full revolution and typically about one full rotation. Such rotation is preferably as that depicted as arrow F in FIG. 3 in a counter clockwise direction if the chain D is laid out to the right and in a clockwise direction if the chain D is laid out to the left. However, it is conceivable that the wheel W could be rotated in either direction and still function effectively according to this invention.

Once revolution of the wheel W has occurred, a second end of the dual tire chains D which has clips C (or other connectors) thereon will generally be dangling down from an upper portion of the tire T with one clip C located on a left side of the dual wheel W pair, one clip C located on a right side of the dual wheel W pair and one clip C dangling between the two tires T of the dual wheel W pair. Typically the most difficult step in tire chain installation is causing the first and second ends to be effectively captured together. In this particular instance, with the dual tire chains D, three such clips C must be clipped to end links L. While end links L are referred to, the clips C could connect to links other than end links L to tightly close the dual tire chains D around the dual wheel W pair.

Bringing the clips C adjacent to and clipping them to links L adjacent to the first end of the dual tire chains D is generally easy and straightforward at the left side and right side of the dual wheel W pair. However, the middle longitudinal section typically has its end links positioned low and down between the two tires in a position which is somewhat difficult to reach. Furthermore, the end link L of the middle longitudinal section at the first end of the dual tire chains D is generally elevated up off of the ground somewhat but in a position which is difficult to reach between the two tires T.

To facilitate bringing the end link L adjacent to the clip C for this central longitudinal section of the dual tire chains D, the handle 32 of the pin 30 is grasped and the pin 30 is translated (along arrow A) releasing the removable chain leader 60. The removable chain leader 60 is then removed (along arrow B of FIG. 1). The hook 66 remains connected to the end link L at the first end of the central elongate section of the dual tire chains D. Thus, the tire chain installer can grasp this removable chain leader 60 which has effectively added temporarily length to the central longitudinal section of the dual tire chain D. While the chain installer grabs this removable chain leader 60 and pulls on it, the end link L at the first end of the central longitudinal section of the dual tire chains D can be easily found and positioned. The clip C at the second end of the central longitudinal section of the dual tire chains D can then be brought adjacent to the end link L at the first end of the central longitudinal section of the dual tire chains D and the clips C coupled to the end link L (or links adjacent to the end link L). Finally, the removable chain leader 60 can have hooks 66 removed from the end link L and the removable chain leader 60 can be reattached to the pin 30 of the bar 20 so that the all of the parts of the tool 10 remain together.

Accordingly, utilizing the tool 10 of this invention, the tool 10 initially assists in precisely positioning the dual tire chains D where desired around the dual wheel W pair. The tools 10 hold end links L at left and right sides of the dual wheel W pair in a convenient location for connection with clips C at the second end of the dual tire chains D to complete their attachment together. The tool 10 also provides this secondary benefit of having a removable chain leader 60 at a mid portion of the tool 10 which can be removed from the tool 10 after a central longitudinal section of the dual tire chains D has been wrapped around a space between the two wheels W of the dual wheel W pair. This removable chain leader 60 acts as a "tail" which is more easily grasped and utilized to find the end link L of the central longitudinal section of the dual tire chains D, to facilitate clipping to the clip C on the second end of the central longitudinal section of the dual tire chains D.

The tool 10 conveniently has a pin 30 translating to removably capture the removable chain leader 60 to the tool 10. By spring loading the pin 30 with the spring 40, the bar 10 only allows the removable chain leader 60 to be removed when a user purposely applies a force to the handle 32 of the pin 30 to move the pin 30 to the released position, for allowing the removable chain leader 60 to be removed and utilized according to this invention.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A tire chain installation tool for dual wheel pairs, the tool comprising in combination:

an elongate rigid bar extending between a left end and a right end;

a left flexible leader fixed to said bar on a portion of said bar closer to said left end than to said right end;

a right flexible leader fixed to said bar on a portion of said bar closer to said right end than to said left end;

a middle flexible leader removably attachable to said bar between said left flexible leader and said right flexible leader;

each of said leaders having a distal end with a coupler thereon;

wherein said middle leader is removably attachable to a point on said bar midway between said left flexible leader and said right flexible leader; and wherein said bar has a hollow core, a pin located within said bar, said pin slidable longitudinally within said bar and extending out of one of said ends of said bar, said bar having a side wall surrounding said hollow core with an opening in said side wall passing into said hollow interior of said bar, said opening located at said point on said bar midway between said left flexible leader and said right flexible leader, said opening sufficiently large to allow a proximal end of said middle flexible leader to pass through said opening and removably connected to said pin within said hollow interior of said bar, said pin slidable between a capture position with a tip of said pin extending past said opening in said side wall of said bar to a release position with said tip located short of said opening in said side wall of said bar, with said proximal end of said middle flexible leader released by said pin when said pin moves from said capture position to said release position.

2. The tool of claim 1 wherein said pin includes a stop thereon, and wherein said pin extends out of one of said ends of said rigid bar through a hole, said stop on said pin is larger than said hole, such that said stop keeps said pin from being removed entirely out of said hollow core of said bar.

3. The tool of claim 2 wherein a spring is interposed between said stop and said end of said bar through which said pin extends, said spring located within said hollow core of said bar and keeping said pin located with said tip of said pin extending past said opening in said side wall of said bar unless said spring is compressed.

4. The tool of claim 3 wherein said pin includes a handle on a portion thereof located outside of said hollow core of said bar and beyond said hole in said end wall through which said pin extends, said handle configured to be graspable by a user so that the user can grasp the pin and translate the pin longitudinally in sliding fashion within said hollow core of said bar.

5. The tool of claim 1 wherein said coupler on said distal end of each said flexible leader includes a hook on said distal end of each said leader.

6. The tool of claim 5 wherein said flexible leaders are in the form of lengths of chain.

7. The tool of claim 5 wherein said flexible leaders are each in the form of cables.

8. The tool of claim 1 wherein each of said flexible leaders have a similar length.

* * * * *